United States Patent [19]

Jost et al.

[11] 4,281,081
[45] Jul. 28, 1981

[54] PROCESS FOR GRAFT COPOLYMERIZATION

[75] Inventors: Heinz Jost, Messel; Hellmuth Knoell, Reichenbach; Gerhard Markert, Ober-Ramstadt-Eiche; Horst Pennewiss, Neu-Kranichstein, all of Fed. Rep. of Germany

[73] Assignee: Röhm GmbH, Darmstadt, Fed. Rep. of Germany

[21] Appl. No.: 8,395

[22] Filed: Feb. 1, 1979

[30] Foreign Application Priority Data

Feb. 11, 1978 [DE] Fed. Rep. of Germany ....... 2805826

[51] Int. Cl.$^3$ ............................................. C08F 255/02
[52] U.S. Cl. ............................... 525/281; 252/51.5 R; 252/51.5 A
[58] Field of Search ............... 260/878 R, 885, 857 G; 252/51.5 R, 51.5 A; 525/281

[56] References Cited

U.S. PATENT DOCUMENTS

| | | | |
|---|---|---|---|
| 3,067,163 | 12/1962 | Bauer | 260/885 |
| 3,089,832 | 5/1963 | Black | 260/878 R |
| 4,098,710 | 7/1978 | Elliott | 260/878 R |
| 4,146,489 | 3/1979 | Stambaugh | 252/51.5 A |

FOREIGN PATENT DOCUMENTS

1244435 9/1971 United Kingdom .

*Primary Examiner*—Paul R. Michl
*Attorney, Agent, or Firm*—Curtis, Morris & Safford

[57] ABSTRACT

What is disclosed are the method of making a lubricating-oil additive which improves the viscosity index and has a dispersing and detergent action, which method comprises graft copolymerizing, onto an oil-soluble base polymer, from 0.5 to 10 parts of a polymerizable lactam together with 0.1 to 3 parts of a polymerizable N-heterocyclic compound, said parts being by weight of said base polymer, and the lubricating-oil additives so produced.

6 Claims, No Drawings

PROCESS FOR GRAFT COPOLYMERIZATION

The present invention relates to an improved method of graft copolymerization to form lubricating oil additives and to the additives so produced.

The development of viscosity-index improvers (VI improvers), that is lubricating-oil additives having a base of oil-soluble polymers and which improve the viscosity-temperature behavior of multigrade mineral oil, has achieved a relatively high technical level. In addition to their thickening action, the polymers in question must have sufficient shear stability. Furthermore, the polymers should, insofar as possible, reduce the pour point of the mineral oil and develop a dispersing and detergent action toward low-temperature sludge produced and toward dirt depositing in the engine.

Lubricating-oil additives having a base of olefin copolymers (OCPs), for instance ethylene-propylene copolymers, play an essential role. Polyolefins have an excellent thickening action. However, they do not have any pour-point-reducing effect so that special pour-point improvers are added to them. They can even impair the pour-point-reducing action of lubricating-oil additives comprising esters of methacrylic acid or of acrylic acid. In addition, they can lead to deposits of lacquer in the engine. The properties of the olefin copolymers can be influenced, for instance, by grafting suitable monomers thereon, for instance derivatives of acrylic acid and/or of methacrylic acid.

The prior art has already proposed viscosity-index improving polymers having dispersing and detergent action in which a compound having a vinyl unsaturation, such as, for instance, methylmethacrylate (MMA), methacrylamide, or 2-ethyl-hexyl acrylate, is polymerized by grafting onto a polyolefin base polymer.

Lubricating-oil additives have also been proposed for the preparation of which monomers, inter alia unsaturated nitrogen-containing organic compounds, including vinyl-substituted organic compounds having a nitrogen-containing ring or rings such as N-vinylpyrrolidone, are polymerized on a preexisting polymer by means of a high-energy ionizing radiation.

In accordance with still further prior art, graft copolymers which are suitable as lubricating-oil additives are obtained if certain monomers, such as esters of unsaturated acids, heterocyclic vinyl compounds, unsaturated amides and the like, are grafted onto ethylene-propylene copolymers which have been degraded by oxidation.

High-grade lubricating-oil additives which also are of substantial technical importance have been developed on the basis of methacrylic acid esters and acrylic acid esters, predominantly those esters of alcohols having 8 to 18 carbon atoms.

In accordance with still further prior art, products having dispersing and detergent action are obtained, for instance, by copolymerizing acrylic acid esters or methacrylic acid esters of alcohols having at least 8 carbon atoms with ethylenically unsaturated compounds containing a basic tertiary amino group in which the tertiary amine nitrogen is a member of a heterocyclic ring and the polymerizable double bond is located outside the ring but seated directly on the ring.

The multifunctional, namely detergent and wear-preventing, action of a copolymer of acrylic acid esters and alkacrylic acid esters of alcohols having at least 8 carbon atoms with polymerizable basic heterocyclic compounds—with the exception of those mentioned above—has also been disclosed in the prior art.

Still further, the prior art teaches that a copolymer of an alkyl acrylate or methacrylate, preferably having 4 to 18, and particularly 16 and more, carbon atoms in the alkyl radical, and N-vinyl-2-pyrrolidone exhibits dispersant and detergent properties, improvement of the viscosity index, and a pour-point-reducing action.

Still another way of arriving at lubricating-oil additives of high dispersant effect is proposed in the prior art. Namely, unsaturated compounds having a tertiary nitrogen atom are polymerized free-radically in the presence of a base polymer which consists essentially of acrylic acid esters or methacrylic acid esters having at least 8 carbon atoms in the alcohol portion, or of fumaric acid esters or itaconic acid esters having 8 to 18 carbon atoms in the alcohol portion, or of mixtures of these esters, or of isobutylene.

In general the following can be noted:

The dispersing and detergent action of VI improvers is obtained by copolymerization or grafting with additional hydrophilic polar groups which produce an affinity for the (water-containing) dirt.

To be sure, the copolymerization or grafting of groups which cause or reinforce the dispersing and detergent action in its turn creates problems. Thus, for instance the imidazole group, which imparts a detergent action to the polymer, can cause disturbances with respect to the action of commercial anti-oxidants.

Based on practical experience, preference is therefore frequently given to N-vinyl pyrrolidone as a dispersion-active monomer since it does not create any disturbances with respect to certain commercial anti-oxidants. However, the addition of N-vinyl pyrrolidone, in comparable concentrations, produces a lower detergent action.

This defect cannot be simply counteracted by grafting-on a larger amount of N-vinyl pyrrolidone, because the amount of N-vinyl pyrrolidone which can be grafted-on in accordance with the known methods is limited. Namely, because of the relatively low graft yields, homopolymers are produced in such quantity that they act as flocculating agents and, in addition to this, cause the formation of lacquer.

According to the present invention, it has been found that the graft yields, referred to polymerizable lactams, and particularly of N-vinyl lactams, especially N-vinyl pyrrolidones, can be considerably increased if the latter are co-grafted in combination with smaller quantities of a polymerizable N-heterocyclic compound, particularly N-vinyl imidazole and its alkyl-substituted derivatives.

According to existing results, the nature of the base polymer does not play a limiting role herein. That is, the increase in the graft yield of polymerizable lactams, and particularly of N-vinyl pyrrolidone, obtained in accordance with the invention by the addition of a polymerizable N-heterocyclic compound, in particular of N-vinyl imidazole, as a graft component, occurs both in the case of olefinic base polymers such as ethylene-propylene copolymers and in the case of pure polyalkylmethacrylates, as well as in mixtures of the two. As a rule, the olefinic base copolymers comprising ethylene-propylene are those having a content of between 20 and 80 percent by weight of ethylene. Olefinic base polymers, particularly ethylene-propylene copolymers of the kind useful according to the present invention, are taught in German Unexamined Application for Pat. Nos. (DE- OS) 1 963 039, 1 644 941, 2 059 981, 1 939 037 and 1 769 834.

According to the present invention, "polymerizable lactam" is to be understood as referring to, for instance, lactams having 5 to 6 ring members, including cyclic acid amides and the corresponding thiolactam compounds which have a polymerizable group, particularly an N-vinyl group, and derivatives derived therefrom, such as the alkyl compounds.

As examples mention may be of 3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl-pyrrolidone, 5-methyl-5-ethyl-1-vinyl pyrrolidone, 3,4,5-trimethyl-3-ethyl-1-vinyl pyrrolidone, N-vinyl caprolactam, and in particular N-vinyl pyrrolidone.

By "polymerizable N-heterocyclic compound" are to be understood 5- and 6-membered heterocycles which have one or more nitrogen atoms in the molecule and which have a polymerizable group, particularly an N-vinyl group, especially N-vinyl imidazole. Other especially suitable polymerizable heterocyclic compounds are those claimed in German Pat. No. 1 745 359.

It is known that the graft yields increase with increasing concentration of the base chains in the graft medium (oil). Therefore it is advantageous to effect the grafting at concentrations of greater than 50 percent by weight of base polymer in the graft medium. To be sure, with such high polymer concentrations, particularly in the case of olefin polymers, problems arise due to the high viscosity of the solution.

With increasing content of olefin copolymers, the grafting process becomes increasingly more difficult, because of the increasing viscosity of the graft medium. Conversely, in the case of mixtures of olefin copolymers with polyalkyl-methacrylates, grafting in the traditional manner, i.e. in an agitator vessel, is all the more readily feasible the higher is the relative proportion of polyalkylmethacrylate.

It has further been found that the technical difficulties attributable to high polymer concentrations can be overcome by effecting the graft reaction according to the present invention in an extruder. This preferably applies to carrying out the process with a base polymer which consists entirely or to a large extent of polyolefin.

The amount of polymerizable lactams to be used as graft components in accordance with the invention, and particularly of N-vinyl pyrrolidone as a monomer, can be between 0.5 and 10 percent by weight, and preferably between 1 and 5 percent by weight, of the total base polymer. The amount of the polymerizable N-heterocyclic compound, particularly N-vinyl imidizole as monomer, can be from 0.1 to 3 percent by weight, preferably 0.2 to 2 percent by weight, referred to the total base polymer. The ratio of polymerizable N-heterocyclic compound, particularly N-vinyl imidazole, to polymerizable lactam, particularly N-vinyl pyrrolidone, is advantageously from 1:2 to 1:5 and particularly 1:3.

A comparison of the graft yields of N-vinyl pyrrolidone both on an ethylene-propylene copolymer and on a mixture of 70 percent by weight polyalkylmethacrylate and 30 percent by weight of an ethylene-propylene copolymer, obtained on the one hand in the manner described in the prior and on the other hand in accordance with the process of the invention in the presence of N-vinyl imidazole, gives, for instance, the following picture:

The yield of a graft process employing a 50 percent solution of a base polymer of ethylene-propylene copolymer in oil and 3 percent by weight of N-vinyl pyrrolidone (referred to base polymer) increases from about 14 percent without addition of N-vinyl imidazole to more than 40 percent upon the addition of one percent by weight of N-vinyl imidazole. Other conditions being the same, the graft yield, with a content of 70 percent by weight of base polymer increases from about 24 percent to about 75 percent if N-vinyl imidazole is used as a graft component, in addition to the N-vinyl pyrrolidone, and in an amount about one third the weight thereof.

A comparable result is obtained also when using mixtures of polyolefins with polyalkylmethacrylates and when using pure polyalkylmethacrylates as base polymers.

In accordance with the experience at hand, the nature of the base polymer, for instance whether polyolefin or polyalkylmethacrylate or one of the different copolymers developed by industry, or polymer mixtures are present, does not limit the use of the process of the invention.

The process of the invention—provided that the viscosity of the base polymer does not exceed a value of $\eta = \sim 15,000$ maPa.s—can also be carried out in conventional fashion, for instance in a stirred vessel. As concerns other pertinent measures, for instance the use of solvents, initiators, temperature control, etc., the process can be carried out in accordance with the prior art.

The graft copolymers produced by means of the process of the invention combine the desired properties of the two graft-comonomers, particularly the good dispersing action of the N-vinyl pyrrolidone and the good detergent action of the N-vinyl imidazole, without any substantial detrimental effects on other additives.

A better understanding of the present invention and of its many advantages will be had by referring to the following specific Examples, given by way of illustration.

EXAMPLE 1

The following mixture is introduced into a 3-liter four-necked flask equipped with a stirrer, thermometer, reflux condenser, and dosing inlet:

817.5 g of mineral oil ($\eta 100°$ C. $= 5.3$ mm$^2$/s)

86.4 g of the methacrylic acid ester of a $C_{12}$–$C_{18}$-alcohol mixture 4.5 g of methyl methacrylate 1.6 g of tert.-butyl peroctoate After solution of the components, the following materials are uniformly introduced, over a period of 214 minutes, into the aforementioned mixture held at 90° C.:

561.9 g of the methacrylic acid ester of a $C_{12}$–$C_{18}$-alcohol mixture 29.7 g of methyl methacrylate 4.74 g of tert.-butyl peroctoate Two hours after the mixture has been introduced, 1.38 g of tert.-butyl peroctoate are post-added. The total polymerization time is 18 hours. The base polymer so obtained is then divided into three equal parts each containing 500 g. Further processing takes place in a 1-liter four-necked flask of the same arrangement. To the three 500 gram samples of the base polymer, the following mixtures are respectively added:

(A) 7.04 g of vinyl pyrrolidone 0.59 g of tert.-butyl benzoate (B) 7.04 g of vinyl pyrrolidone 2.35 g of vinyl imidazole 0.59 g of tert.-butyl perbenzoate (C) 2.35 g of vinyl imidazole 0.59 g of tert.-butyl perbenzoate The grafting in each case takes place at 130° C., and 0.28 g of tert.-butyl perbenzoate is added after one hour and after two hours. The total grafting time is six hours.

The polymers are isolated from the solutions obtained according to A, B, C by precipitation with ethanol. After reprecipitating several times and drying, the nitrogen content in the isolated graft copolymer is determined according to Kjeldahl and the graft yield is then calculated on the basis of the nitrogen-containing monomer introduced.

(A) N-content: 0.18% Graft yield calculated on vinyl pyrrolidone: 47%

(B) N-content: 0.46% Grafting yield calculated on vinyl pyrrolidone: 89%*

(C) N-content: 0.12%

*The calculation follows after subtraction of the nitrogen content of sample C).

EXAMPLE 2

The apparatus and procedure is as in Example 1.
Starting mixture:
817.5 g of mineral oil ($\eta 100°$ C. = 5.3 mm$^2$/s)
204.3 of ethylene-propylene-copolymer (72% ethylene; number average molecular weight=90,000, U=0.9)**
107.9 g of the methacrylic acid ester of a $C_{12}$–$C_{18}$-alcohol mixture
5.7 g of methyl methacrylate
1.0 g of tert.-butyl peroctoate

**U is a measure of the inhomogeneity of the polymer and is defined as (weight avg. mol wt./number avg. mol wt. -1)

Addition at 90° C.
346.4 g of the methacrylic acid ester of a $C_{12}$–$C_{18}$ alcohol mixture
18.3 g of methyl methacrylate
2.91 g of tert.-butyl peroctoate
Post addition of 0.96 g of tert.-butylperoctoate.

The base polymer is again divided into three portions each containing 500 g and grafting is carried out as in Example 1. The following results were obtained:

(A) N-content: 0.14 percent Graft yield based on vinyl pyrrolidone: 35 percent (B) N-content: 0.43 percent Graft yield based on vinyl pyrrolidone: 87 percent*

(C) N-content: 0.10

*Calculation after subtraction of the N-content according to (C).

EXAMPLE 3

315 g ethylene-propylene-copolymer
(72 percent ethylene; number average molecular weight=90,000; U=0.9) and
140 g of mineral oil ($\eta 100°$ C.=5.3 mm$^2$/s)
are homogeneously mixed at 100° C. in a double-screw extruder. The viscous mass is then divided into three equal parts each containing 151.7 g. Each part is homogeneously mixed at 100° C. in a double-screw extruder with one of the following mixtures:

(A) 3.28 g of vinyl pyrrolidone 0.53 g of tert.-butyl perbenzoate (B) 3.28 g of vinyl pyrrolidone 1.09 g of vinyl imidazole 0.53 g of tert.-butyl perbenzoate (C) 1.09 g of vinyl imidazole 0.53 g of tert.-butyl perbenzoate Grafting in each case follows in plastic bags, sealed by fusion to be air-tight, in a drying oven at 130° C. over five hours. In each case, the nitrogen content and, therefrom, the graft yield are determined as in Example 1 on the graft co-polymers purified by precipitation. The following results are obtained:

(A) N-content: 0.09 percent Graft yield calculated on vinyl pyrrolidone: 23.7%

(B) N-content: 0.38 percent Graft yield calculated on vinyl pyrrolidone: 73%*

(C) N-content: 0.01 percent

*Calculated after substraction of the N-content according to (C)

Instead of the N-vinylpyrrolidone used in the above Examples, the following polymerizable lactams can be employed:

3-methyl-1-vinyl pyrrolidone, 4-methyl-1-vinyl pyrrolidone, 5-methyl-1-vinyl pyrrolidone, 3-ethyl-1-vinyl pyrrolidone, 3-butyl-1-vinyl pyrrolidone, 3,3-dimethyl-1-vinyl pyrrolidone, 4,5-dimethyl-1-vinyl pyrrolidone, 5,5-dimethyl-1-vinyl pyrrolidone, 3,3,5-trimethyl-1-vinyl pyrrolidone, 4-ethyl-1-vinyl pyrrolidone, 5-methyl-5-ethyl-1-vinyl pyrrolidone, 3,4,5-trimethyl-3-ethyl-1-vinyl pyrrolidone, and N-vinyl caprolactam. Instead of N-vinyl imidazole, for example also 1-vinyl-2-methyl imidazole, 1-vinyl-2-ethyl imidazole, 1-vinyl-2-isopropyl imidazole, and 2-tert. butyl imidazole are used with very good results.

What is claimed is:

1. The method of making a lubricating-oil additive which improves the viscosity index and has a dispersing and detergent action, which method comprises graft copolymerizing 0.5 to 10 percent of N-vinyl pyrrolidone together with 0.1 to 3 percent of N-vinyl imidazole onto an oil-soluble base polymer selected from the group consisting of polyalkyl methacrylic acid esters of alcohols having at least 8 carbon atoms and mixtures of said polyalkyl methacrylic acid esters with a polyolefin, said percentages being by weight of said base polymer.

2. A method as in claim 1 wherein said graft copolymerization is carried out in an extruder.

3. A method as in claim 1 wherein the ratio by weight of said N-vinyl pyrrolidone to said N-vinyl imidazole is from 2:1 to 5:1.

4. A method as in claim 1 wherein from 1 to 5 percent of N-vinyl pyrrolidone and from 0.2 to 2 percent of N-vinyl imidazole, by weight of said base polymer, are graft copolymerized onto said base polymer.

5. A lubricating-oil additive prepared by the method of claim 1.

6. A lubricating-oil additive prepared by the method of claim 2.

* * * * *